United States Patent [19]

Röckl et al.

[11] 4,193,646
[45] Mar. 18, 1980

[54] FLYWHEEL WITH SPRING LOADED BEARING

[75] Inventors: Gerhard Röckl, Gaiberg; Gerhard Nieder, Walldorf; Hans-Holger Schulz, Neckarsteinach, all of Fed. Rep. of Germany

[73] Assignee: Teldix GmbH, Heidelberg, Fed. Rep. of Germany

[21] Appl. No.: 853,448

[22] Filed: Nov. 21, 1977

[30] Foreign Application Priority Data

Nov. 20, 1976 [DE] Fed. Rep. of Germany ....... 2652846

[51] Int. Cl.$^2$ ...................... F16C 33/80; F16C 35/00; F16C 39/02
[52] U.S. Cl. ............................. 308/187.1; 308/189 R; 74/574
[58] Field of Search .............. 74/572, 574; 308/189 A, 308/189 R, 187, 236, 187.1

[56] References Cited

U.S. PATENT DOCUMENTS

| | | | |
|---|---|---|---|
| 1,102,547 | 7/1914 | Rockwell | 308/189 R |
| 1,773,427 | 8/1930 | Larsh | 308/189 R |
| 2,345,952 | 4/1944 | Smith | 308/189 R |
| 2,592,387 | 4/1952 | Brown | 308/187.1 |
| 3,316,036 | 4/1967 | Bligard et al. | 308/189 R |
| 3,679,277 | 7/1972 | Dohmen | 308/187.1 |
| 3,774,982 | 11/1973 | Nakamura et al. | 308/187.1 |
| 3,807,815 | 4/1974 | Kasabian | 308/189 |

FOREIGN PATENT DOCUMENTS

| | | | |
|---|---|---|---|
| 870048 | 1/1953 | Fed. Rep. of Germany | 308/187 |
| 2424546 | 12/1974 | Fed. Rep. of Germany | 308/187 |
| 575339 | 4/1923 | France | 74/572 |

*Primary Examiner*—Benjamin Wyche
*Assistant Examiner*—David C. Reichard
*Attorney, Agent, or Firm*—Spencer & Kaye

[57] ABSTRACT

A flywheel includes a hub sleeve, a stationary core surrounded by the hub sleeve, axially spaced first and second rolling-element bearings each having an inner ring supported on the core and an outer ring in engagement with the hub sleeve, an inner spacer sleeve disposed between the inner rings and surrounding the core and an outer spacer sleeve disposed between the outer rings and surrounding the inner spacer sleeve and a clamping arrangement axially urging the inner rings against the inner spacer sleeve and the outer rings against the outer spacer sleeve with a predetermined axial force. An axially yielding, relatively rigid spring element forms part of the clamping arrangement and engages at least one of the rings with the predetermined axial force. The spring element is substantially unyielding to the predetermined axial force, but yields to axial forces derived from vibrations imparted to the flywheel. Cooperating extensions of the spring element and and an outer ring constitute a labyrinth seal.

4 Claims, 1 Drawing Figure

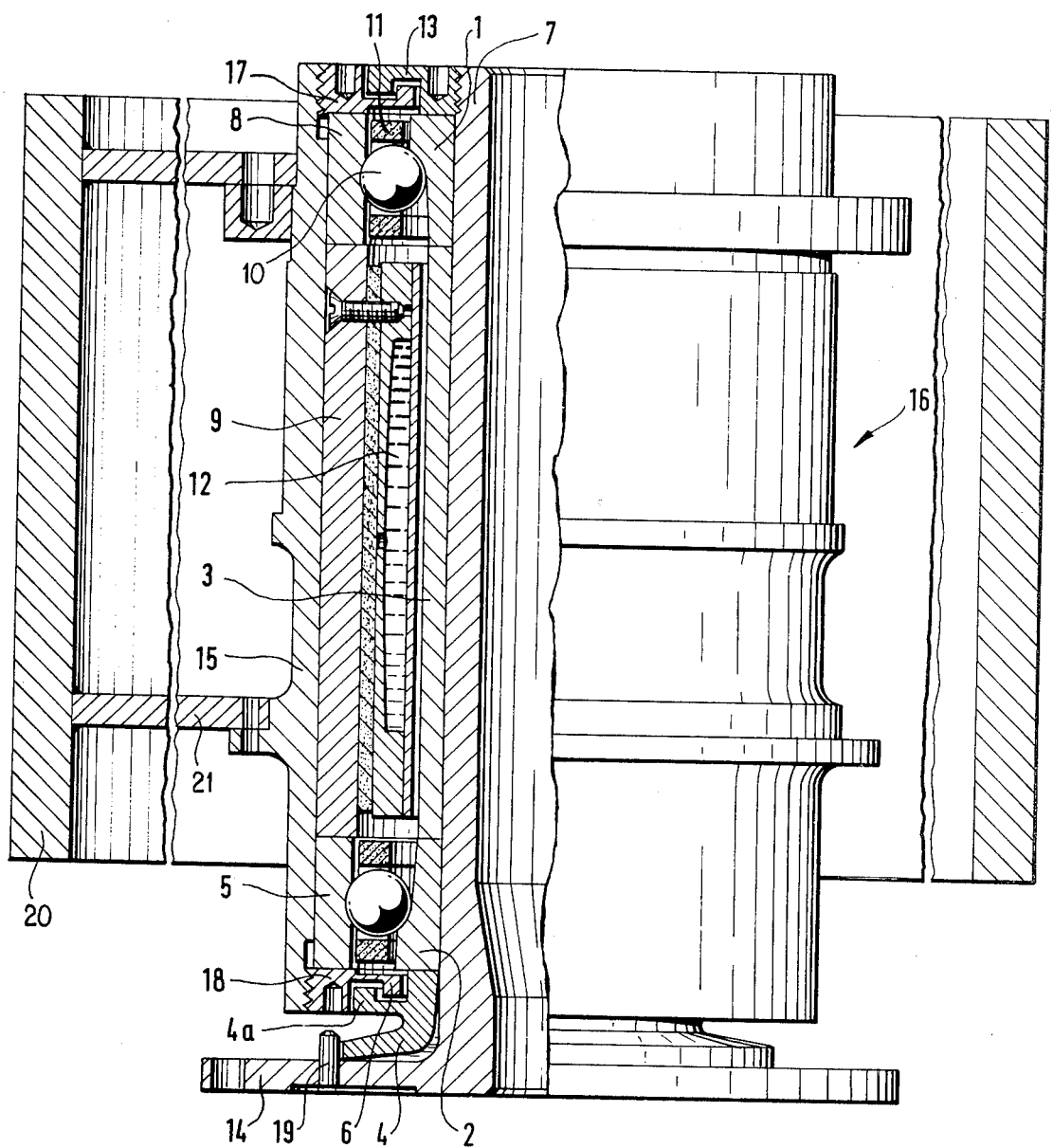

FLYWHEEL WITH SPRING LOADED BEARING

BACKGROUND OF THE INVENTION

This invention relates to a flywheel or a reaction wheel particularly for use in satellites or other space vehicles. The flywheel includes a bearing assembly of the known type which has two axially spaced rolling-element bearings (hereafter "ball bearings") which are surrounded by a hub sleeve and which are arranged on a stationary (non-rotating) core. The inner rings of the two ball bearings as well as the outer rings thereof are axially biased towards one another and are in engagement with an interposed inner spacer sleeve (for the inner rings) and an interposed outer spacer sleeve (for the outer rings).

A flywheel or a reaction wheel for the above-outlined purpose is disclosed in German Laid-Open Application (Offenlegungsschrift) No. 22 25 925. The structure disclosed therein has, at its outer radius, an annular flywheel mass which is connected with the hub by means of connecting elements, such as spokes. These connecting elements are provided with additional means, such as a stressed (biased) annulus for dampening oscillations or vibrations which are generated, for example, during the launching of the rocket carrying the space vehicle incorporating the flywheel. These dampening means may also find application in the structure designed according to the invention. They are, however, not an essential component thereof.

In a reaction wheel or flywheel of the above-outlined type in which biasing of the bearing unit or, more particularly, the biasing of the ball bearings towards one another is effected by means of a fixed clamping of the ball bearing rings with the intermediary of spacer sleeves, large mechanical stresses exerted on the bearing unit, for example, during the launching of the carrier rocket, can lead to permanent deformations within the bearing unit.

SUMMARY OF THE INVENTION

It is an object of the invention to provide an improved bearing unit in which, during critical vibrational stresses directed transversely to the bearing unit and the accompanying large bending moment of the bearing core, the resulting shearing stresses on the clamping elements, such as threaded clamping rings is reduced to such an extent that permanent deformations in the zone of the thread and thus damages to the clamping arrangement and losses in the bias are avoided.

This object and others to become apparent as the specification progresses, are accomplished by the invention, according to which, briefly stated, the flywheel includes a hub sleeve, a stationary core surrounded by the hub sleeve, axially spaced first and second rolling-element bearings each having an inner ring supported on the core and an outer ring in engagement with the hub sleeve, an inner spacer sleeve disposed between the inner rings and surrounding the core and an outer spacer sleeve disposed between the outer rings and surrounding the inner spacer sleeve and a clamping arrangement axially urging the inner rings against the inner spacer sleeve and the outer rings against the outer spacer sleeve with a predetermined axial force. An axially yielding, relatively rigid spring element forms part of the clamping arrangement and engages at least one of the rings with the predetermined axial force. The spring element is unyielding to the predetermined axial force, but yields to axial forces derived from vibrations imparted to the flywheel.

By virtue of the invention as outlined above, the very markedly progressive characteristic of the shearing stress prevailing in conventional, fixed clamping arrangements is substantially linearized. Further, the relatively rigid spring element serves, during the transversal vibrational stresses, as a dampening element resulting in a substantial reduction of the stresses that always appear during resonance phenomena.

The bearing unit may be sealed with respect to the external environment by labyrinth seals. In accordance with a further feature of the invention, that side where the spring element is provided, the stationary part of the labyrinth seal is constituted by an extension forming part of the spring element.

BRIEF DESCRIPTION OF THE DRAWING

The sole FIGURE is an axial sectional view of a preferred embodiment of the invention.

DESCRIPTION OF THE PREFERRED EMBODIMENT

Turning now to the Figure, the bearing unit structured according to the invention is designated generally at 16. It comprises a stationary axial core 7, a first ball bearing having an inner ring 1 and an outer ring 8, as well as a second ball bearing having an inner ring 2 and an outer ring 5. An inner spacer sleeve 3 is arranged between the two inner rings 1 and 2 and surrounds the core 7. Between the outer rings 5 and 8 there is arranged an outer spacer sleeve 9 which surrounds the inner spacer sleeve 3. Between the ring pairs 1, 8 and 2, 5 there are arranged bearing balls 10 supported in respective separators 11. The outer rings 5 and 8 as well as the outer spacer sleeve 9 are surrounded by a hub sleeve 15 on which the flywheel mass is mounted. The two rotary outer rings 5 and 8 thus carry the sleeve 15 which constitutes the hub of the flywheel, the spokes of which are to be connected with the hub. In the inside of the bearing unit there is provided a lubricant reservoir 12 which is not described in detail. At one end of the bearing unit 16, adjacent the ball bearing 2, 5, 10, 11, there is provided a clamping element pair formed of a relatively stiff, annular spring element 4 supported by a radial flange 14 of the core 7 and an outer clamping ring 18 threaded into the inner wall of the hub sleeve 15. The spring element 4 is in engagement with a radial end face of the inner bearing ring 2, while the outer clamping ring 18 is in engagement with a radial end face of the outer bearing ring 5. The outer clamping ring 18 has a radially inwardly directed extension 6 which, together with a radially outwardly directed extension 4a of the spring element 4 constitutes a labyrinth seal.

A pin 19 which is held by the terminal securing flange 14 of the core 7 extends into a forked part of the spring element 4 to prevent rotation of the spring element 4 and the inner rings 1 and 2. It is to be understood, however, that the invention may find application in bearing units in which the inner ball bearing rings are allowed to rotate as well.

At the other end of the bearing unit 16, adjacent the ball bearing 1, 8, 10, 11, there is provided a further clamping element pair formed of an inner clamping ring 13 threaded into the outer wall of the core 7 and an outer clamping ring 17 threaded into the inner wall of the hub sleeve 15. The two clamping rings 13 and 17 are in engagement with a radial end face of the inner and outer bearing rings 1 and 8, respectively. Similarly to the clamping element pair 4, 18, the inner and outer clamping rings have radially extending, cooperating extensions constituting a labyrinth seal. By appropriately tightening (rotating), for example, the clamping rings 13 and 17, towards the clamping ring 18 and the spring element 4, the two ball bearings are, with a predetermined force, firmly clamped (biased) against the spacer sleeves 3 and 9 between the core 7 and the hub sleeve 15, along the precise length of the spacer sleeves 3 and 9. It is noted that the "relative" rigidity of the spring element 4 is so designed that in the above-described axial biasing of the bearing unit, the spring element 4 acts as a substantially non-yielding (rigid) component. It is an important function of the relatively rigid spring element 4 to absorb, by yielding, axial compression stresses generated in the spacer sleeve 3 and the clamping element 13 during bending stresses exerted on the core 7. The spring element 4 thus relieves the inner clamping ring 13 of excessive axial compressing forces which could damage (permanently deform) the biasing structure and thus cause losses in the biasing force. It is a further function of the spring element 4 to dampen transverse vibrations (which cause the above-noted bending stresses), advantageously resulting in reduced loads on the core to thus obtain a more accurate alignment of the spin vector.

The flywheel mass 20 is connected with the hub sleeve 15 by spokes 21.

It will be understood that the above description of the present invention is susceptible to various modifications, changes and adaptations, and the same are intended to be comprehended within the meaning and range of equivalents of the appended claims.

What is claimed is:

1. In a flywheel including a hub sleeve, a stationary core surrounded by the hub sleeve and a bearing unit having first and second ends and including axially spaced first and second rolling-element bearings situated at the first and second ends, respectively, of the bearing unit, each rolling-element bearing having an inner ring supported on the core and an outer ring in engagement with the hub sleeve; an inner spacer sleeve disposed between the inner rings and surrounding the core and an outer spacer sleeve disposed between the outer rings and surrounding the inner spacer sleeve and clamping means axially urging the inner rings against the inner spacer sleeve and the outer rings against the outer spacer sleeve with a predetermined axial force; the improvement comprising a radial terminal flange forming part of said core and being situated adjacent said second end of said bearing unit; and further wherein the improvement in said clamping means comprises (a) a first clamping arrangement for urging said outer rings against said outer spacer sleeve; said first clamping arrangement including
 (1) a first clamping ring threadedly held in an inner face of said hub sleeve at said first end of said bearing unit; said first clamping ring engaging said outer ring of said first rolling-element bearing;
 (2) a second clamping ring threadedly held in an inner face of said hub sleeve at said second end of said bearing unit; said second clamping ring engaging said outer ring of said second rolling-element bearing; and
(b) a second clamping arrangement for urging said inner rings against said inner spacer sleeve; said second clamping arrangement including
 (1) a third clamping ring threadedly held in an outer face of said core at said first end of said bearing unit; said third clamping ring engaging said inner ring of said first rolling-element bearing;
 (2) an axially yielding, relatively rigid spring element engaging said terminal flange and a radial face of said inner ring of said second rolling-element bearing; said spring element being substantially unyielding to said predetermined axial force and yielding to axial forces derived from vibrations imparted to said flywheel.

2. A flywheel as defined in claim 1, further comprising a securing pin carried by said radial terminal flange and means defining a forked portion in said spring element; said securing pin extending into said forked portion for preventing rotation of said spring element and said inner rings of said rolling-element bearings with respect to said core.

3. A flywheel as defined in claim 1, wherein said spring element is a spring disc.

4. A flywheel as defined in claim 1, wherein said spring element is an annular part surrounding said core the improvement further comprising a labyrinth seal constituted by cooperating extensions of said spring element and said second clamping ring.

* * * * *